July 19, 1960
J. W. LASSITER
2,945,318
FISHING LURE
Filed June 6, 1957
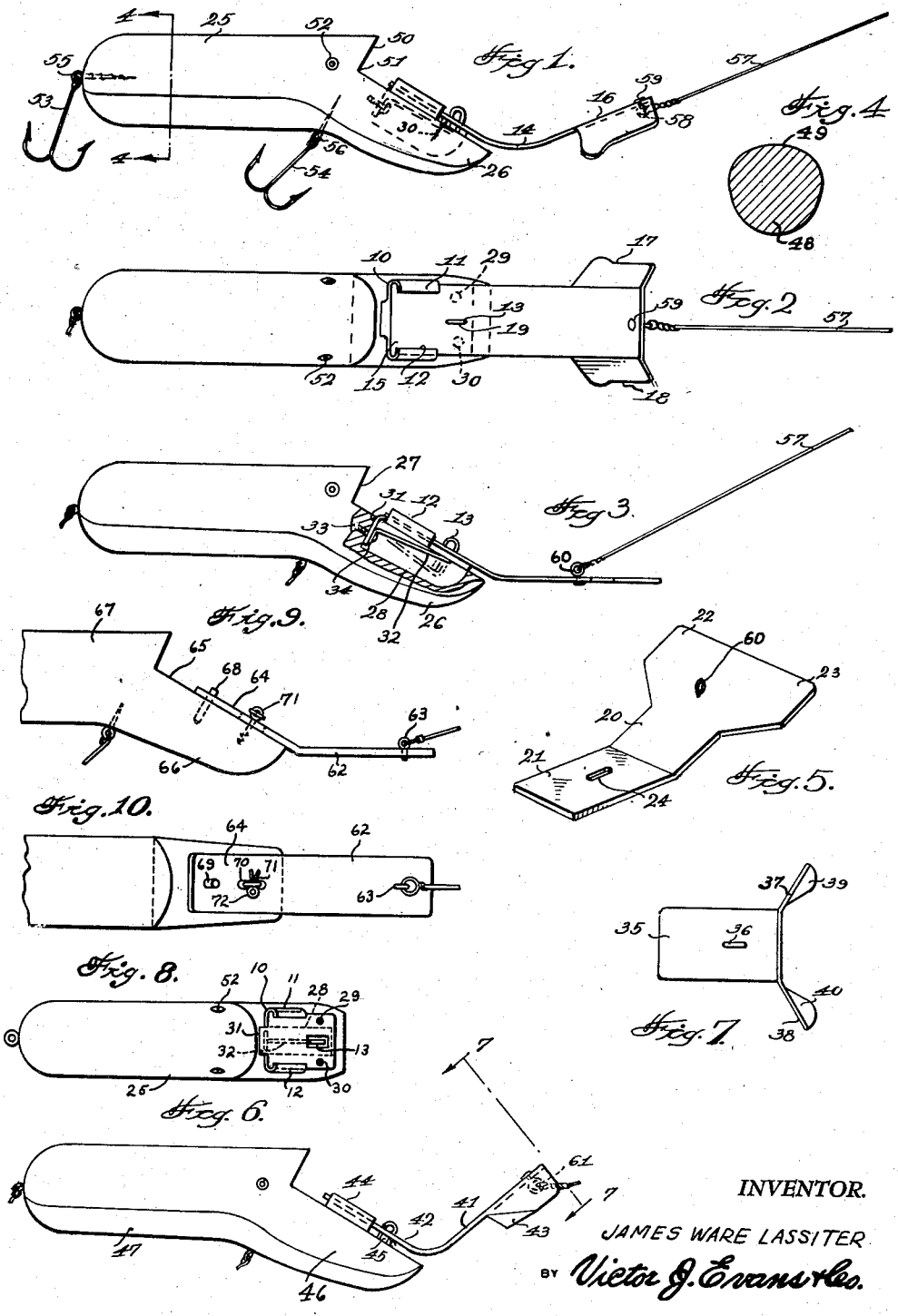
INVENTOR.
JAMES WARE LASSITER
BY *Victor J. Evans & Co.*
ATTORNEYS

United States Patent Office 2,945,318
Patented July 19, 1960

2,945,318

FISHING LURE

James Ware Lassiter, 1520 Boone St., Bryan, Tex.

Filed June 6, 1957, Ser. No. 664,142

1 Claim. (Cl. 43—42.47)

This application is a continuation in part of my copending application filed the 31st day of May 1956, with the Serial No. 588,523 in that a deflecting plate is mounted on a solid bill, at the leading end of the lure.

This invention relates to fishing lures of the plug type and in which a plug having hooks depending therefrom is attached to a fishing line. In particular the invention includes a plug having an elongated body, somewhat oval-shaped in cross section and having a downwardly sloping bill on the forward end with a mounting plate secured in position on the inclined surface of the bill. The invention also includes a plurality of plates of different designs formed to provide deflectors to be alternately secured to the mounting plate. By substituting one plate for another the same lure may be used for surface or deep fishing. The lure may also be used for heavy fish, casting, snagging, or for drawing through the water, such as in trolling.

The purpose of this invention is to provide an interchangeable mounting for a fishing lure whereby plates of different patterns may be used on the same plug.

Fishing lures have been provided in various designs and the average fisherman includes numerous plugs and other lures in a fishing tackle outfit. There is, however, a limit to the number of plugs or other lures that may be continuously carried in a fishing tackle box. Without increasing the size of the tackle box it is impossible to carry as many types of lures as may be desired. With this thought in mind this invention contemplates multiplying the use of each lure by providing a plurality of deflector plates of different designs. The invention also includes means for attaching selected plates to plugs or other parts of lures depending upon conditions under which a fisherman is operating.

The object of this invention is, therefore, to provide an improved fishing lure in which parts of the lure may readily be changed to provide a surface or deep water lure.

Another object of the invention is to provide means for attaching deflecting plates to a fishing plug whereby the plates are so mounted that they may readily be removed and replaced.

A still further object of the invention is to provide an improved fishing lure having interchangeable plates adapted to be carried by a plug in which the lure is of a simple and economical construction.

With these and other objects and advantages in view the invention embodies an elongated body somewhat oval-shaped in cross section and having a bill extended from the forward end. The upper surface of the bill is inclined downwardly from the head. The invention also includes a mounting plate having clips on the sides and an eye in the intermediate part mounted over a recess in the bill. In addition the invention includes deflecting plates having tongues adapted to be positioned over the eye on the bill and with edges thereof adapted to be positioned in the clips on the sides of the mounting plate.

Other features and advantages of the invention will appear from the following description taken in connection with the drawing, wherein:

Figure 1 is a side elevational view of the improved lure showing a fishing line attached to an angularly disposed plate on the forward end of the lure.

Figure 2 is a plan view of the lure shown in Fig. 1.

Figure 3 is a side elevational view similar to that shown in Fig. 1, showing a flat plate with wings at the sides secured by a tongue extended from one end between the clips on the sides of the mounting plate on the bill of the lure.

Figure 4 is a cross section through the body of the lure taken on line 4—4 of Fig. 1.

Figure 5 is a view illustrating one of the deflecting plates adapted to be used on the bill of the lure.

Figure 6 is a view similar to that shown in Fig. 1 showing a plate of a different design mounted in the clips on the upper surface of the bill of the lure.

Figure 7 is a plan view showing a plate or spoon of a different design.

Figure 8 is a plan view of the body of the lure shown in Figs. 1 and 2 with the deflector plate omitted.

Figure 9 is a side elevational view showing the end of a plug with a plate having a tongue secured to the upper surface of a bill by a screw eye and post and with the opposite end of the plate provided with an eye for a fishing line.

Figure 10 is a plan view of the end of the lure shown in Fig. 9.

Referring now to the drawing wherein like reference characters denote corresponding parts the improved fishing lure of this invention includes a mounting plate 10 having clips 11 and 12 extended inwardly from opposite edges and an eye 13 extended from the intermediate part. A plate 14 having a tongue 15 on one end is positioned on the mounting plate with edges of the tongue retained in the clips 11 and 12. The end of the plate 14 opposite to that from which the tongue extends is provided with an angularly positioned section 16 with wings 17 and 18 extended from edges thereof. The tongue portion 15 of the plate is also provided with a slot 19 that is positioned to receive the eye 13.

The plate 14 may be replaced by a plate 20 having a tongue 21 extended from one end and wings 22 and 23 from sides of the opposite end. The plate 20 may be positioned on the mounting plate 10 with edges of the tongue extended below the clips 11 and 12 and with a slot 24 positioned over the eye 13.

The deflecting plates are used on a plug 25 having a bill 26 with a downwardly sloping upper surface 27. The bill of the plug is also provided with a recess 28 which is spaced inwardly from the leading end.

The mounting plate 10 is positioned on the upper surface 27 of the bill 26. The mounting plate extends over a portion of the recess 28. The plate is secured in position with screws 29 and 30. The upper end of the plate is provided with a depending flange 31 that extends into the cavity 28 of the bill. The eye 13 is carried on the end of a spring arm 32 and the parts are mounted in the cavity of the bill with a rivet 33 that extends through a flange 34 of the spring arm and also through the flange 31 of the mounting plate, as shown in Fig. 3. With the eye 13 mounted in this manner it may readily be depressed in the slots 19 and 24 of the tongues of the different plates or attachments to facilitate changing from one device to another.

In the design shown in Fig. 7 an attachment is provided having a tongue 35 with a slot 36, similar to the slots 19 therein. The tongue 35 is provided with wings 37 and 38 that extend from opposite sides and the wings are provided with deflectors 39 and 40, respectively.

The device illustrated in Fig. 6 is similar to that shown in Figs. 1 and 2 except that an outer section 41 extends from the tongue 42 at an angle slightly greater than a right angle. The section 41 is provided with wings 43, similar to the wings 17 and 18. The tongue 42 extends under clips 44 on a mounting plate 45 and the plate 45 is retained in position on the upper surface of a bill 46 of a plug by an eye 47.

The body of the plug is substantially oval-shaped in cross section as shown in Fig. 4 in which the lower portion 48 is described on a smaller radius than the upper portion 49. However, it will be understood that the plug may be provided in different shapes in cross section.

The leading end of the plug is provided with a beveled surface 50 that extends from a point 51 at the inner end of the bill 26. Eyes 52 are provided on the sides of the body adjacent the shoulder formed by the surface 50. The plug is also provided with hooks 53 and 54 that are pivotally connected with eyes 55 and 56 to the body of the plug. The eyes are threaded into the plug, as shown in Fig. 1.

Although the mounting plate is shown as being mounted on a bill of a plug it will be understood that the mounting plate may be secured to any convenient part of a plug or other lure and the plate may be secured to the lure by suitable means. With the mounting plate positioned on the bill, as shown and described, a tongue of an attachment or other plate is inserted in the clips 11 and 12 with the eye 13 depressed. With the tongue in position the eye is released whereby it is snapped upwardly by the spring arm 32 through a slot in the tongue, such as the slots 19, 24, and 36. With the eye extended upwardly through the tongue the deflector plate or attachment is rigidly secured to the lure.

A fishing line 57 may be attached to the eye 13, or as illustrated in Fig. 1, the fishing line is attached to an eye 58 that is secured in the plate 14 with a rivet 59. As shown in Figs. 3 and 5 the line may also be attached to an eye 60 on the plate 20 or, as shown in Fig. 6, the line may be attached to an eye 61, similar to the eye 58, shown in Fig. 1.

The lure may also include a plate 62 having a line attaching eye 63 spaced from one end thereof with a tongue 64 extending at an angle, less than a right angle to a plane in which the plate is positioned from the opposite end, and the tongue 64 is positioned on the upper surface 65 of a bill 66 of a lure having a body 67.

The bill 66 is provided with a pin 68 that extends through an opening 69 in the tongue 64 and the tongue is provided with a slot 70 that extends over a screw eye 71 whereby with the opening 69 over the pin 68 a cotter pin 72 extended through the eye 71 locks the plate 62 on the lure.

The lure is, therefore, adapted to be fitted with deflecting plates of different designs so that the same plug may be used for various purposes.

It will be understood that other modifications, within the scope of the appended claim, may be made in the design and arrangement of the parts without departing from the spirit of the invention.

What is claimed is:

In a fish lure, the combination which comprises an elongated body, substantially cylindrical in cross-section, and having a bill located on the front end of said body, said bill having a downwardly inclined upper surface on the leading end, the trailing end of the upper surface of the bill terminating at a point spaced downwardly from the upper surface of the body providing an over-hanging lip with an end surface inclined rearwardly from the upper surface of the body to meet the upper surface of the bill, the upper surface of the bill having a screw eye and a pin extended therefrom and the screw eye and pin being in spaced relation, a plate positioned in a plane substantially parallel to a horizontal plane through the longitudinal axis of the body, and spaced downwardly from said plane through the body, said plate being positioned forwardly of the bill and having an inclined section positioned on the upper surface of the bill, said inclined section of the plate having a slot therein for receiving the screw eye of the bill and also an opening positioned to receive the pin extended from the bill, the screw eye and pin providing positioning means for retaining the plate in alignment with the body, a line attaching eye extended from the plate and spaced rearwardly from the leading edge of the plate, a hook attaching eye extended from the lower surface of the bill, and a fastener extended through the eye positioned in the slot of the upwardly inclined section of the plate.

References Cited in the file of this patent

UNITED STATES PATENTS

| | | |
|---|---|---|
| 1,333,154 | Buddle | Mar. 9, 1920 |
| 1,341,618 | Medley | May 25, 1920 |
| 1,600,653 | Steenstrup | Sept. 21, 1926 |
| 1,714,053 | Stokes | May 21, 1929 |
| 1,832,172 | Winter | Nov. 17, 1931 |
| 2,134,330 | Fink | Oct. 25, 1938 |
| 2,245,061 | Winiewski | June 10, 1941 |
| 2,313,709 | Dunkelberger | Mar. 9, 1943 |
| 2,441,302 | Watkin | May 11, 1948 |
| 2,482,466 | Cooper | Sept. 20, 1949 |
| 2,604,717 | Henry | July 29, 1952 |